July 29, 1952
S. BILLECI
2,604,806
SONOMETER FOR TESTING MUSICAL EAR
Filed Oct. 19, 1948
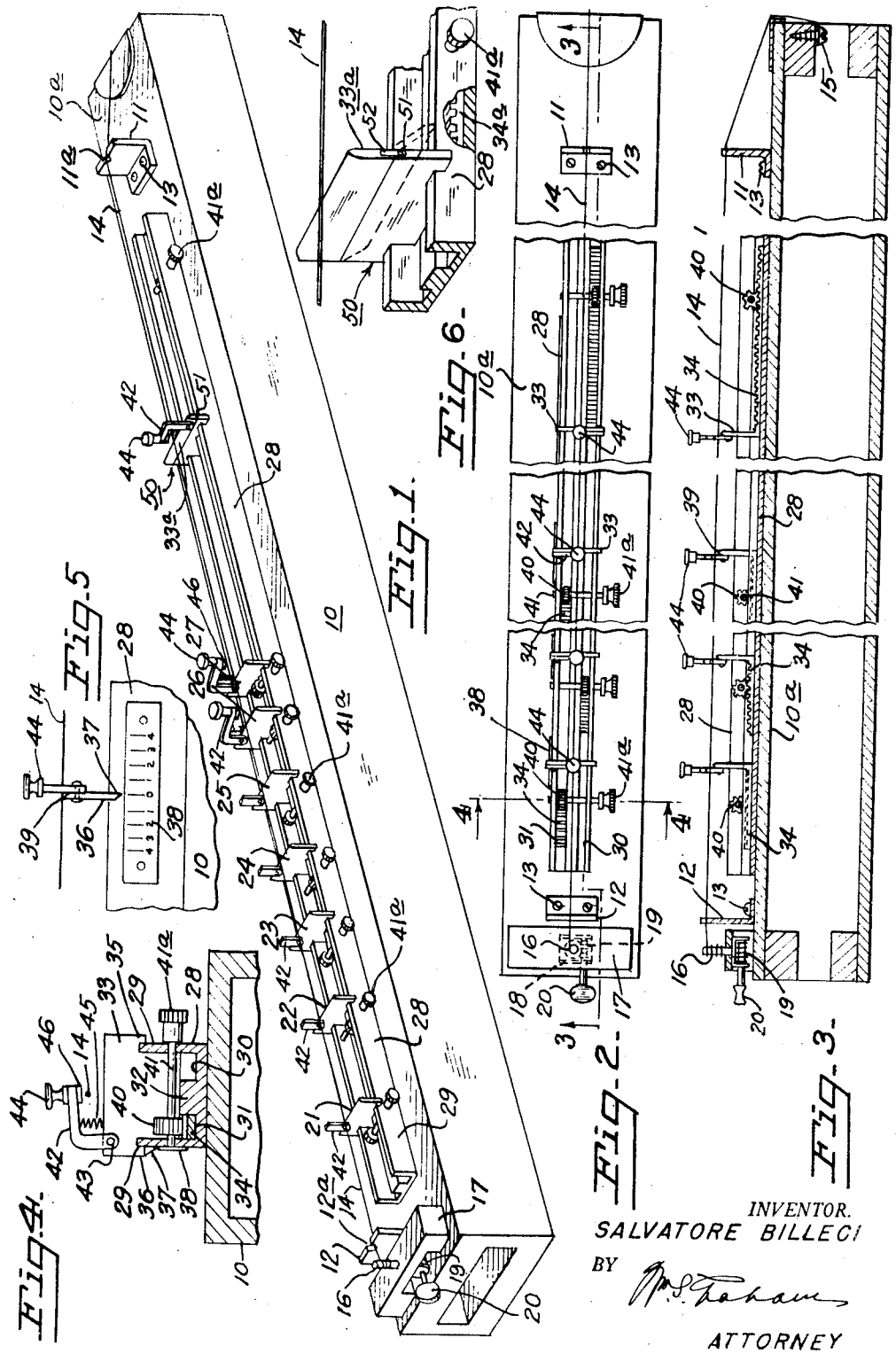
INVENTOR.
SALVATORE BILLECI
BY
ATTORNEY Patented July 29, 1952

2,604,806

UNITED STATES PATENT OFFICE 2,604,806

SONOMETER FOR TESTING MUSICAL EAR

Salvatore Billeci, San Francisco, Calif.

Application October 19, 1948, Serial No. 55,270

6 Claims. (Cl. 84—455)

This invention relates to sonometers, sometimes called monochords, for testing persons for musical ear, and more particularly relates to such apparatus having a plurality of adjustably movable bridges upon which an open fundamental tonal wire or string may be selectively pressed to test recognition by ear of a true or false tone.

The term musical ear is employed to express the capacity of the human ear for pitch discrimination in relation to an equal tempered common major or minor scale, melodically or harmonically.

In such an apparatus it is desirable not only to test ability to recognize true tones in a scale or a melodic sequence in a major or minor scale, but also to recognize harmonious consonant or dissonant or discordant tones sounded simultaneously or in arpeggio fashion. Thus, a person's conception of a major scale or sensitivity to pitch in relation to the scale may be determined by measuring his response on a calibrated measuring device, such as a standardized dial, scale, or other visible indicator, the true value being objectively predetermined by a sensitive instrument which records visually that which is heard by one's ear.

Among the objects of the invention are to provide a sonometer to test the ability of the human ear to recognize true tonal values in a major or minor scale.

Another object is to provide an apparatus to indicate visibly the extent of tonal error in pitch discrimination of the human ear in relation to the major or minor scale or the harmonic sequence.

A further object is to provide adjustable means for testing the capacity of the human ear to discriminate the sound relationship of the several tones in the major or minor scales.

Yet another object is to provide means to measure by visible indicator the extent of accuracy or error in recognition of tonal values in a musical scale.

With the foregoing and other objects in view, which will be apparent from or further set forth in this specification, one form in which the invention may be embodied is herein described, and illustrated in the accompanying drawing, it being understood that changes in detail may be resorted to by substitution of equivalents without departing from the spirit and scope of the invention defined in the appended claims.

In the accompanying drawing:

Fig. 1 is a perspective view of the musical ear testing apparatus of the invention.

Fig. 2 is a broken plan view of the apparatus of Fig. 1.

Fig. 3 is a longitudinal vertical broken section on line 3—3 of Fig. 2.

Fig. 4 is an enlarged vertical section on line 4—4 of Fig. 2.

Fig. 5 is a fragmentary end view of Fig. 4 looking in direction of the arrow in Fig. 4.

Fig. 6 is a fragmentary enlarged perspective view of part of apparatus of Fig. 2.

Referring to the accompanying drawing in which like reference characters indicate corresponding parts in the several views, 10 indicates an elongated hollow sound box of well-known type, one elongated side wall of which comprises a sound board 10a.

The operative mechanism of the apparatus is mounted on the outer upper face of the sound board. Adjacent each opposite end of the sound board there is provided an end bridge 11, 12, upstanding from the face of the sound board, these bridges being preferably fixed in position and may be secured to the sounding board by suitable bolts 13. Longitudinally overlying the sound board between the end bridges 11, 12 and supported thereby is stretched tautly a tonal wire designated as fundamental tone wire 14 which is adjustably tensioned, and preferably is a steel piano wire, mounted in notches 11a and 12a in the respective end bridges. The notch in one end bridge, say the bridge 12, is deeper than in the opposite bridge, so that the tonal wire is inclined upwardly from one bridge to the other, relative to the plane of the underlying sound board, for reasons and purposes hereafter described in connection with the operation of the apparatus. One terminal end of the wire is fixed to a suitable pin 15 at an end of the sound box and the opposite terminal end portion of the wire is wound around one end of a rotatable tuning pin or adjustment post 16, the latter being upstandingly mounted for axial rotation through a supporting block 17 and having a worm gear 18 at its opposite end meshing with a worm drive thread 19 of a rotatable shaft and finger grip key 20 by which the post 16 may be axially rotated and thus increase or decrease the tension of the fundamental tone wire 14.

Underlying the tensioned wire 14 and preferably more nearly adjacent to the lower end of the inclined fundamental tone wire 14, is an adjustable means for selectively shortening the effective vibrating length of the tensioned fundamental tone wire 14, comprising a series or plurality of fret bridges which are separately or individually longitudinally movable relative to the tonal wire and sound board, and preferably seven in number, indicated consecutively 21, 22, 23, 24, 25, 26, and 27. The fret bridges ride in and are guided by an elongated channel member 28 mounted longitudinally upon the sound board. The channel member has upstanding parallel side walls 29 and is provided at the bottom of the channel with a pair of relatively spaced longitudinal parallel grooved tracks 30, 31 providing therebetween an upstanding rail 32.

Each of the fret bridges 21 to 27, inclusive, comprises a plate 33 the lower portion of which fits transversely snugly slidably in the channel member, perpendicular to the side walls and bottom of the channel, the lower edge of each of the fret bridge plates having connected adjacent one of its side edges an extended toothed rack 34 at right angles to the plane of the plate, and slidable in one of the grooves 30, 31, the toothed racks of next adjacent fret bridges being positioned adjacent the opposite side edges of the respective next adjacent plates so that the rack of next adjacent fret bridges ride in opposite parallel channels.

The upper portion of the fret bridges or plates are preferably wider than the channel members so as to overhang the upper free edge of the side walls 29 of the channel member as at 35 and having a guiding finger 36 depending downwardly outside of the channel wall, serving to better align the plate for sliding movement in the channel. Means are provided for indicating the degree of correctness of placement of the fret bridges, and as herein exemplified. One of said overhanging guide fingers may serve also as an indicator finger, as at 37, to slide along a calibrated scale 38 mounted longitudinally on the exterior of one side wall of the channel for purposes to be described. The upper terminal edge of each of the fret bridge plates is preferably narrowed to a tapered reasonably dull edge as at 39 so as to present a fairly narrow line of contact with the wire 14 when the latter is pressed thereagainst.

Means are provided for moving the fret bridges longitudinally of the channel member and therefore longitudinally with relation to the overlying tensioned wire 14 and the calibrated scale 38, such means being any suitable arrangement for engaging the rack bar 34 to move it and its connected plate selectively in either longitudinal direction, such as a rack pinion gear 40 which engages in the teeth of the toothed rack 34 and is rotated by a shaft 41 rotatably mounted transversely through the side walls of the channel member, and having at its free end a finger grip 41a preferably circular and knurled, by which the shaft and pinion may be rotated to move the rack and plate selectively in either direction. It is to be understood that the rack and plate are so positioned that when a fret bridge plate 33 is disposed at the correct tonal position according to the calibrated scale, the pinion will engage the teeth of the rack approximately midway of the length of the rack to allow amplitude of movement of the plate longitudinally in either direction without the pinion gear interfering with the movement of the plate. The purpose of having the racks and actuating pinions adjacent the respective opposite side edges of the next adjacent plates is to permit amplitude of movement of the racks in the opposed parallel grooves without conflict in the movement thereof, even though the next adjacent plates be operated longitudinally in relatively close proximity.

As will be hereafter described in connection with operation of the apparatus, the tensioned wire 14 is pressed into contact with the upper edge 39 of one of the fret bridge plates 21–27, thus shortening the effective vibrating length of the wire and thereby raising the pitch of sound produced by its vibrations when plucked. If desired, this pressure may be solely manual finger pressure of the wire to bring the wire into firm binding contact with the upper edge 39 of a fret bridge plate, but if desired, mechanical means may be employed as ancillary to such finger pressure. Such a mechanical means is shown herein as a lever arm 42 hingedly mounted as at 43 on one end of the upper edge portion of plate 33 having a finger press button 44 tensioned out of normal contact with tonal wire 14 by coil spring 45, the button having its opposite end 46 adapted to contact the wire 14 and press it firmly against the upper edge of plate 33. Since the lever arm 42 is mounted on the side face of plate 33, the wire 14 will be engaged slightly rearwardly of the tapered edge of the plate, which permits unobstructed vibration of the wire from the contacted plate to its end and gives a better and clearer tone to the vibrated effective portion of the wire when plucked.

The calibrated scale 38 is provided for visible indication of whether the plates of the fret bridges are moved to a position of predetermined standard of tone by the person who is being tested for accuracy of musical ear. As stated, such a scale is preferably mounted on the exterior of the side wall 29 of the channel member which is opposite the finger grips 41a which rotate the shafts 41. The indicator point 37 slides along this scale to indicate visibly the accuracy or the degree of inaccuracy, of the setting of the fret bridges relative to a predetermined objective standardization of the equal tempered major scale.

In operation it will be noted that there are seven fret bridges shown in the present exemplification. There are eight notes in any major or minor scale. The tensioned fundamental tone wire, regardless of what major or minor scale is being tested, is always a note or pitch "Do." This is possible because the purpose of the device is to test accuracy of the ear to determine relative tones or pitch with relation to a datum pitch "Do." For sake of standardization "A 440" is used as the pitch for the open fundamental tone or "Do." The seven fret bridges 21–27 complete the eight notes of a major or minor scale.

The scale 38 is calibrated at each fret bridge with a mark indicating the correct tone or pitch for that particular bridge. Such correct tone or pitch is determined by an electronic standardizing apparatus, commonly termed a stroboscope, though the term sonometer seems somewhat more appropriate as applied to musical tones and pitch. In addition to the indication on the calibrated scale for a correct pitch for the seven true scale positions of the bridges 21–27, there are a plurality of calibrations, four or more in number, on each side of the indication of the correct tone so as to indicate degrees of error from the correct tone either on the flat or sharp side. The scale may, if desired, be longitudinally movable whereby it may be moved from time to time so that a person being tested may not prejudge the correct tone from a certain location of the fret bridge rather than from the tone itself.

When the fret bridges are at correct position for correct tone, the pinion 40 should engage the teeth of the rack bar in spaced relation to the upstanding plate 33 connected thereto, so that the plate may be moved in either direction, since the error of tone may be either higher or lower than the standard or perfect pitch.

The person whose musical ear is to be tested would be placed on the side of the apparatus from which the finger grips 41a extend and the person conducting the test would be placed on the opposite side of the apparatus having the scale 38 visible, the scale not being visible to the person being tested. The person being tested may then pluck the open fundamental tonal wire 14 to receivet the tone of the datum sound "Do." He will then manipulate the finger grips 41a to adjust the first fret bridge 21, press the wire 14 on the edge thereof and pluck the wire, and if necessary, readjust the fret bridge until he establishes, by plucking the tonal wire, the tone which, according to his sonant reflexes, is a consonance of the note "Re" in relation to the datum "Do." And successively through the scale, predicated by the datum "Do," he will adjust the fret bridges for a corresponding "Mi," "Fa," "So," "La," "Ti," and "Do," or he may correspondingly skip intermittently through the scale in any manner such as the commonly used sequence "Do," "Mi," "So," "Do." The person conducting the test may observe the scale 38 on the opposite side of the channel and determine from the scale whether the tone selected is the correct tone, or if in error, the extent of the error. After the person being tested has positioned the fret bridges at positions he believes to be correct, the Examiner may play a well known simple melody consisting of the notes in the major scale, which will practically illustrate the correctness or error in the setting of the fret bridges.

In operation by manual pressure of the finger on the wire, the finger pressure should be just slightly to the rear of the narrowed edge 39 of the fret bridge so as not to interfere with the free vibration of the wire for the remainder of its length. In this connection it will be noted that in the pressure of the mechanical finger or lever 42 the engagement of the tonal wire is slightly offset rearwardly from the edge of plate 33, so that the pressure on the wire will be slightly rearwardly of the narrowed wire-contacting edge of the fret bridge. It has been heretofore stated that the wire 14 inclined upwardly from one end of the apparatus to the opposite end, the purpose of which is to maintain the wire free to vibrate between any fret bridge upon which it is pressed and the opposite fixed end bridge, that is, for example, when the wire is pressed on the fret bridge 24, the wire will be free to vibrate to its effective end at the end bridge 11, without contact with the succeeding fret bridges 25, 26, and 27. The same result of having the wire inclined relative to the upper edge of the fret bridges, may be accomplished by a straight wire parallel with the sound board, and progressively decreasing the height of the plates 33 of the fret bridges from 21 to 27.

Also included in the apparatus is an additional operable bridge assembly 50 which in all structural respects may be identical with the slidable mounting of the fret bridges 21 to 27 inclusive, with the exception that the rack bar 34a is preferably longer for greater longitudinal movement, and the plate 33a of assembly 50 has its upper portion which includes the wire contacting edge, hinged transversely as at 51 so that such upper portion edge may be folded downwardly to be completely free of likelihood of contact with the tonal wire 14 when the scale fret bridges 21–27 are in operation. The foldable upper portion of plate 33a may be restored to a sustained contact with the wire 14 so as to lift the wire clear of the scale fret bridges 21–27. Therefore, the bridge assembly 50 is herein termed a lift bridge to distinguish from the previously described bridges, and it may be releasably sustained in its upraised position by any suitable conventional means, such as a spring clip 52, so that it may slide along the tensioned wire in its sustained upraised position.

Since the purpose of the scale fret bridges is to test the capacity of the ear to discriminate the progressive relative tones or pitches of individual notes in a scale, two such scale tones may not be simultaneously tested on a single wire. The lift bridge having first raised the wire, the wire is thereby divided into two separate operative segments extending, respectively, from the lift bridge to the opposite end bridges, whereby the two segments may be plucked simultaneously, or alternately, on either side of the bridge to test the ear to determine recognition of discord, consonance, or dissonance of tone caused by the vibrating portions of the wire segments between the lift bridge and the opposite end bridges. By moving the geared lift bridge longitudinally responsive to rotation of the finger grip and pinion, similarly as heretofore described, capacity may be measured on a calibrated scale or dial to a perfect standard, in like manner as heretofore described, and all musical intervals, duet style, may be produced melodically in consonance, or dissonance, or in discord.

While the longitudinal movement of the fret bridges and the lift bridges has been described as accomplished by the mechanical means, it is to be understood that the movement of the bridges in a much simplified form of apparatus may be accomplished by merely manually adjusting the bridges along the wire without mechanism to assist in such adjustment.

It is to be observed that one important phase and difference of the present invention in relation to other apparatus of the monochord type is that the apparatus of this invention measures not necessarily the true relation of the notes of the major or minor scale, but the errors of deviation from a correct tone of each scale note, due to the extreme variable in the field of aural conceptions of musical intervals in relation to the scales, whereas other monochord apparatus have set positions to measure true relations.

It may be further added, with particular reference to Fig. 6, that the lift bridge assembly 50 is probably more convenient in operation if the mechanical means for pressing the wire 14 against the fret bridge, is omitted, and manual finger pressure employed exclusively for pressing the wire against the bridge, since the finger-press member may be an inconvenient obstruction when plucking the wire simultaneously on both sides of the bridge.

Having described the invention, what is claimed to be the subject of Letters Patent is:

1. In a device of the character described, the combination of an elongated hollow sound box and board having relatively spaced end bridges for supporting a tonal wire longitudinally over the sound board, means for adjusting tension of a tonal wire between said end bridges, a plurality of separately movable fret bridges upstanding from the sound board intermediate the end bridges, a toothed rack and cooperating gear means to move the fret bridges and hold them at a position longitudinally of the sound board independently of each other, and means for indicating the degree of correctness of placement of the fret bridges with relation to melodic sequence.

2. In a device for testing musical ear having an elongated sound box and board and having relatively spaced end bridges for supporting a tonal wire and a plurality of separately movable relatively spaced fret bridges upstanding from the sound board intermediate the end bridges, the combination therewith of a lift bridge assembly separate from the series of fret bridges comprising a movable bridge upstanding between the sound board and the tonal wire, and of greater height than the fret bridges and adapted for lifting the tonal wire free of contact with the fret bridges.

3. In apparatus for testing the capacity of the human ear to discriminate relativity of sound tones and having an elongated sound box and board provided with relatively spaced end bridges for supporting a tonal wire and having a plurality of separately movable fret bridges upstanding from the sound board intermediate the end bridges, the combination therewith of a lift bridge assembly separate from the series of fret bridges comprising a movable bridge upstanding between the sound board and the tonal wire and of greater height than the fret bridges and having its upper portion adjacent the wire foldable downwardly free of contact with the wire, the lift bridge being adapted for lifting the tonal wire free of contact with the fret bridges.

4. A device for testing musical ear including an elongated sound box and board having relatively spaced end bridges for supporting a tonal wire, a tonal wire mounted longitudinally of the sound box between the end bridges, a plurality of separately longitudinally movable fret bridges upstanding from the sound board and underlying the tonal wire intermediate the end bridges, said tonal wire and fret bridges being spaced relatively whereby the space between the wire and the fret bridges is progressively increased at successive fret bridges in the series, and means to move the fret bridges longitudinally relative to the wire independently of each other.

5. A device of the character described, comprising an elongated hollow sound box and board having relatively spaced end bridges for supporting a tonal wire, a tonal wire longitudinally overlying the sound box and mounted between the end bridges, means for adjusting the tension of said wire, a plurality of separately longitudinally movable relatively spaced fret bridges mounted upstanding from the sound board and underlying the tonal wire, spring tensioned means carried by the fret bridges for pressing the wire on the respective fret bridges, and means to move the fret bridges comprising a groove track, a toothed rack slidable in the groove and a rotatable gear engaging the rack, said tonal wire and fret bridges being spaced relatively whereby the space between the wire and the fret bridges is progressively increased at successive fret bridges in the series.

6. A device for testing musical ear comprising a sound box and board having end bridges for supporting a tonal wire, a tonal wire longitudinally overlying the sound box and mounted between the end bridges, a plurality of separately longitudinally movable fret bridges upstanding from the sound board and underlying the tonal wire intermediate the end bridges, said tonal wire and fret bridges being spaced relatively whereby the space between the wire and the fret bridges is progressively increased at successive fret bridges in the series, and means to move the fret bridges, in combination with a lift bridge assembly separate from the series of fret bridges, comprising a movable bridge upstanding between the sound board and the tonal wire, and of greater height than the fret bridges and adapted for lifting the tonal wire free of contact with the fret bridges.

SALVATORE BILLECI.

REFERENCES CITED

The following references are of record in the file of this patent:

UNITED STATES PATENTS

| Number | Name | Date |
|---|---|---|
| 467,203 | Schlinenhauer | Jan. 19, 1892 |
| 590,631 | Schneider | Sept. 28, 1897 |
| 1,506,507 | Siegmund | Aug. 26, 1924 |
| 1,622,219 | Bartholomae | Mar. 22, 1927 |
| 1,640,125 | Klink | Aug. 23, 1927 |
| 2,199,120 | Ulrich | Aug. 30, 1940 |
| 2,368,257 | McBride | Jan. 30, 1945 |
| 2,499,194 | McBride | Feb. 28, 1950 |

FOREIGN PATENTS

| Number | Country | Date |
|---|---|---|
| II–15–711 | Italy | June 30, 1884 |